United States Patent
Tseng et al.

(10) Patent No.: US 7,218,587 B2
(45) Date of Patent: May 15, 2007

(54) METHOD FOR DETERMINING WRITING POWER OF DATA RECORDING DEVICES

(75) Inventors: Hsien-Yu Tseng, Taipei (TW); Shih-Chieh Lee, Ilan (TW); Ching-Hwa Liu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 586 days.

(21) Appl. No.: 10/427,906

(22) Filed: May 2, 2003

(65) Prior Publication Data

US 2003/0210625 A1  Nov. 13, 2003

(30) Foreign Application Priority Data

May 10, 2002  (TW) .................. 91109807 A

(51) Int. Cl.
*G11B 7/00* (2006.01)
(52) U.S. Cl. .................................. 369/47.53
(58) Field of Classification Search .............. 369/47.5, 369/47.51, 47.52, 47.53
See application file for complete search history.

(56) References Cited

U.S. PATENT DOCUMENTS

| | | | |
|---|---|---|---|
| 5,005,164 A * | 4/1991 | Sakamoto et al. | 369/47.53 |
| 6,052,347 A * | 4/2000 | Miyata | 369/47.53 |
| 2002/0003760 A1 * | 1/2002 | Honda | 369/47.52 |
| 2002/0044507 A1 * | 4/2002 | Hagiwara et al. | 369/47.4 |
| 2002/0114232 A1 * | 8/2002 | Seong et al. | 369/47.4 |
| 2002/0150012 A1 * | 10/2002 | Hsiao et al. | 369/47.53 |
| 2006/0023592 A1 * | 2/2006 | Hagiwara et al. | 369/47.53 |

* cited by examiner

*Primary Examiner*—Wayne Young
*Assistant Examiner*—Linh T. Nguyen
(74) *Attorney, Agent, or Firm*—Birch, Stewart, Kolasch & Birch, LLP

(57) ABSTRACT

A method for determining the writing power of data recording devices. First, the inner circle and outer circle of recording media are processed with optimum power calibration (OPC) to obtain an inner circle optimum writing power and an outer circle optimum writing power respectively. The writing power is determined according to the inner circle optimum writing power, outer circle optimum writing power, and/or the time of write speed is raised from the minimum write speed to the maximum write speed of the data recording device.

6 Claims, 7 Drawing Sheets

METHOD FOR DETERMINING WRITING POWER OF DATA RECORDING DEVICES

BACKGROUND OF THE INVENTION

1. Field of the Invention

The present invention relates to a method for determining the writing power of data recording devices, and particularly to a method for determining the writing power of data recording devices according to the inner circle and outer circle optimum writing powers of recording media.

2. Description of the Related Art

Recently, optical storage media, such as compact disc (CD) and recordable compact disc (CD-R and CD-RW) has gained significant standing in the evolution of data storage. With the development of optical storage media, data can be recorded and backed up into high capacity, light discs, taking the place of traditional data storage media.

FIG. 1 shows a block diagram of a disc servo system. The optical head 11 reads reflection signals from the disc 10. After the signal is amplified and processed by the RF (Radio Frequency) IC 12, the FE (Focus Error) signal, TE (Track Error) signal and relative data and signals are input to DSP (Digital Signal Processor) and the micro processor 13.

Then, the micro processor 13 computes servo drive signals by analyzing the received data, and outputs the signals to corresponding servos (Focusing Servo 14, Tracking Servo 15 and Spindle Motor Servo 16) for controlling the actuators (Focusing Actuator 17, Tracking Actuator 18, Sled Motor 19 and Spindle Motor 20) to ensure accuracy when reading or writing (recording) data.

In the process of writing recordable discs, the data is read from hard disk or CD-ROM by the host via the Integrated Drive Electronics (IDE) interface. Then, the data is sent to the buffer memory of data recording devices via IDE interface or Small Computer System Interface (SCSI). Finally, the data in the buffer memory is written to recording media by the data recording devices.

The data recording device always gradually raises its write speed to the maximum write speed or user defined speed according to the preset time regions in Zone Constant Linear Velocity (ZCLV) mode. FIG. 2 shows the variation of write speed of conventional data recording devices. As shown in FIG. 2, the write speed is 16 in the time region 0~t1, the write speed is raised from 16 to 20 in the time region t1~t2, from 20 to 24 in the time region t2~t3, and, after time t3, from 24 to the maximum write speed 32 and maintained until the recording finishes.

In addition, FIG. 3 shows the variation of write speed of another example of conventional data recording devices. As shown in FIG. 3, the write speed is gradually raised from 16 to 32 in the time region 0~t4 and maintained until the recording finishes.

The writing power (laser power) of the optical head is an important factor in influencing the writing result (success or failure). Conventionally, the writing power is determined according to the inner circle optimum writing power and the power difference of each time region. The power difference is dependent on recording media and predefined in the database. In the case of FIG. 2, after Optimum Power Calibration (OPC), the inner circle optimum writing power of a recording media of brand A is $P_0$. The power difference in the time region t1~t2 is $\Delta P_1$, the power difference in the time region t2~t3 is $\Delta P_2$, and the power difference after t3 is $\Delta P_3$ corresponding to the recording media are predefine in the database. Therefore, the writing power is $P_0$ when writing at write speed 16, $P_0+\Delta P_1$ when writing at write speed 20, $P_0+\Delta P_2$ when writing at write speed 24, and $P_0+\Delta P_3$ when writing at write speed 32.

However, the quality of recording media is difficult to maintain, for example, the dye or consistency thereof in the inner circle or outer circle of the recording media may be different. The writing power is not appropriate and the writing may fail if only the inner circle optimum writing power is considered. Further, it is complicated to define the power difference for all types of recording media in the database.

SUMMARY OF THE INVENTION

It is therefore an object of the present invention to provide a method for determining the writing power of data recording devices that dynamically determines the writing power according to the inner circle and outer circle optimum writing powers of recording media.

To achieve the above object, a method for determining the writing power of data recording devices according to a first embodiment of the invention is provided. First, the inner circle and outer circle of recording media are processed with optimum power calibration (OPC) to obtain an inner circle optimum writing power and an outer circle optimum writing power respectively. The writing power from inner to outer is determined according to the inner and outer circle optimum writing powers, respectively. The outer circle is the lead-out area of recording media if the recording media is recordable compact disc. In specification, the lead-out area is the region of radius 11.6 cm to 11.8 cm apart from the center.

Further, a method for determining the writing power of data recording devices according to a second embodiment of the invention is provided. First, the inner circle and outer circle of recording media are processed with optimum power calibration (OPC) to obtain an inner circle optimum writing power and an outer circle optimum writing power respectively. The writing power is determined according to the time when data recording device raises its write speed from the minimum to the maximum and the inner and outer circle optimum writing powers.

According to the embodiments, the data recording device may be CD-R ROM or CD-RW ROM, and the recording media may be CD-R or CD-RW.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

The method for determining the writing power of data recording devices according to the present invention is suitable for use in data recording devices, such as CD-R ROMs and CD-RW ROMs.

Figure 1:
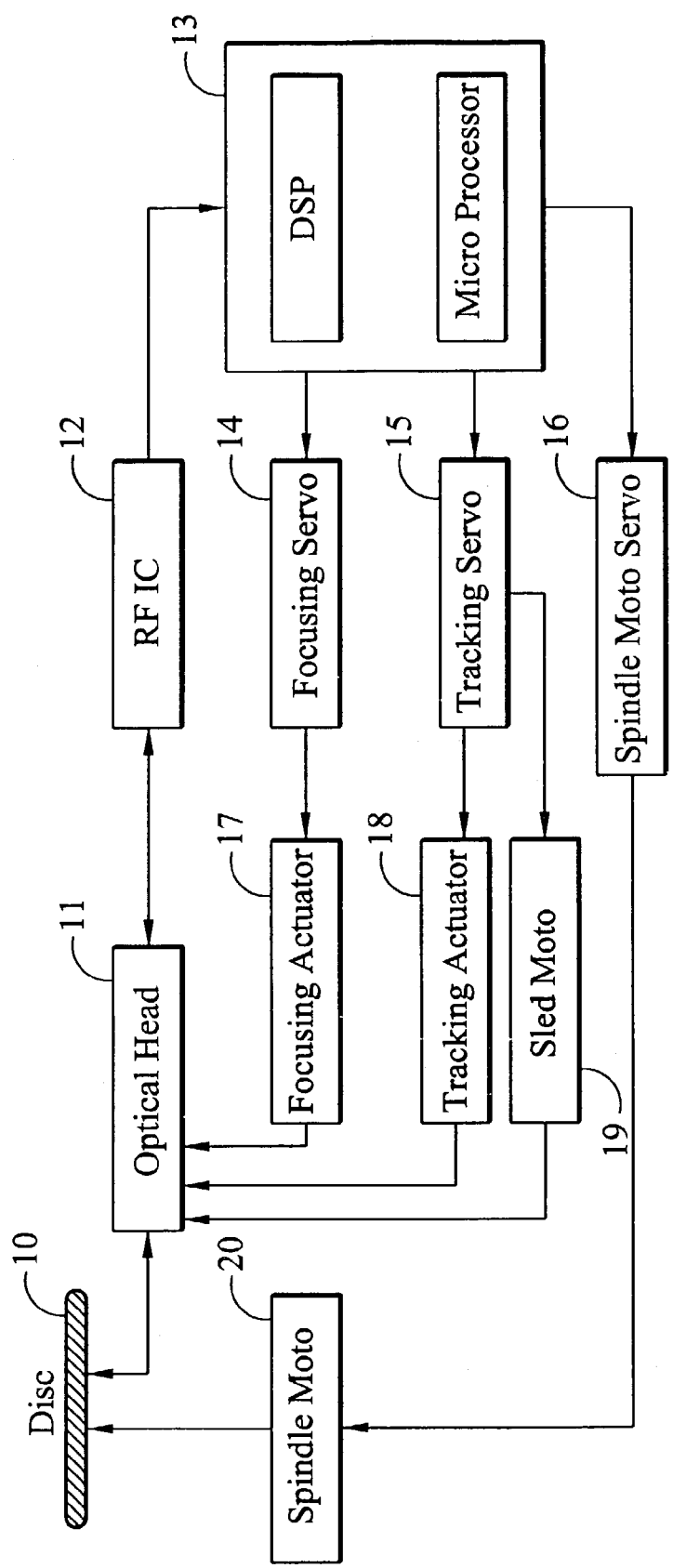
FIG. 1 is a block diagram showing the system architecture of a disc servo system.
Figure 2:
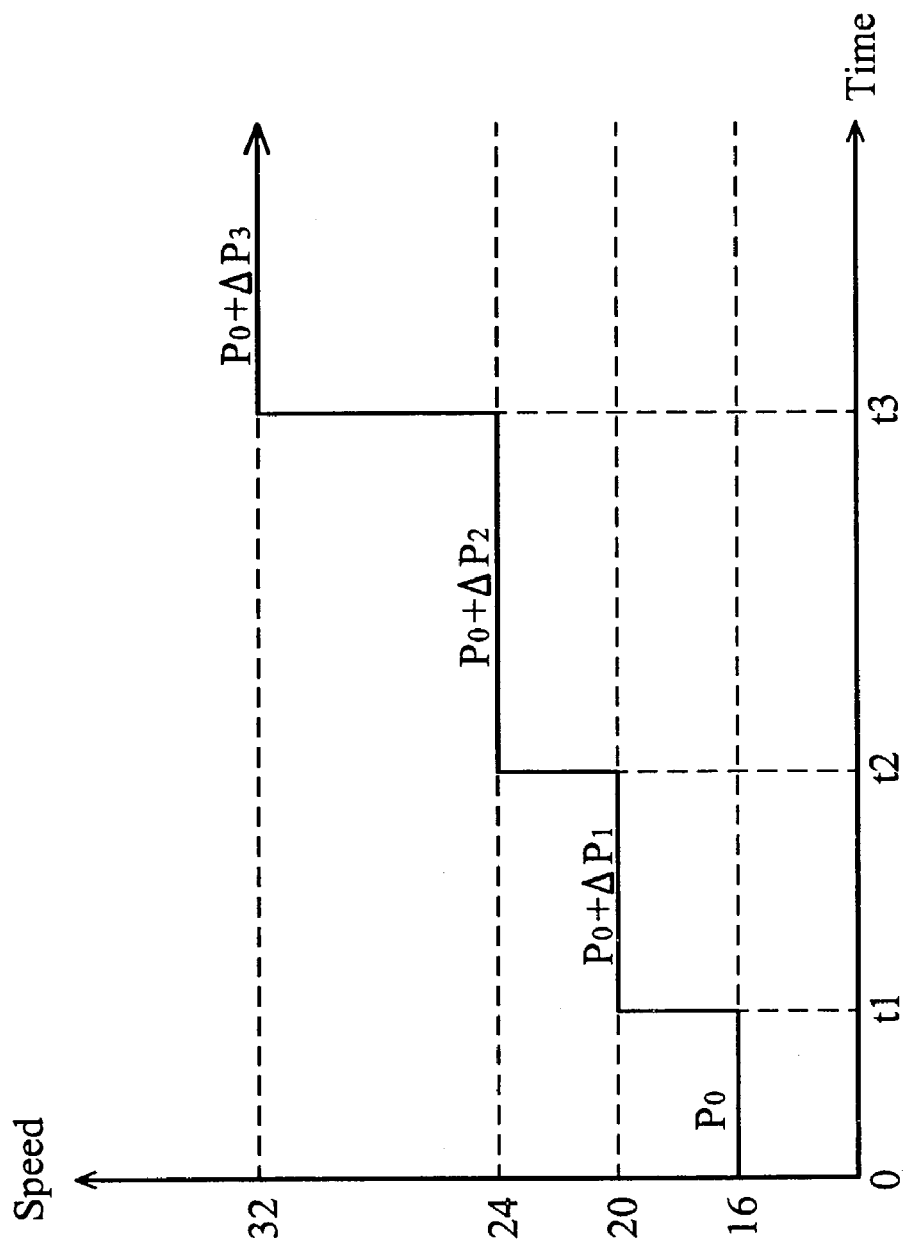
FIG. 2 shows the variation of write speed of conventional data recording devices.
Figure 3:
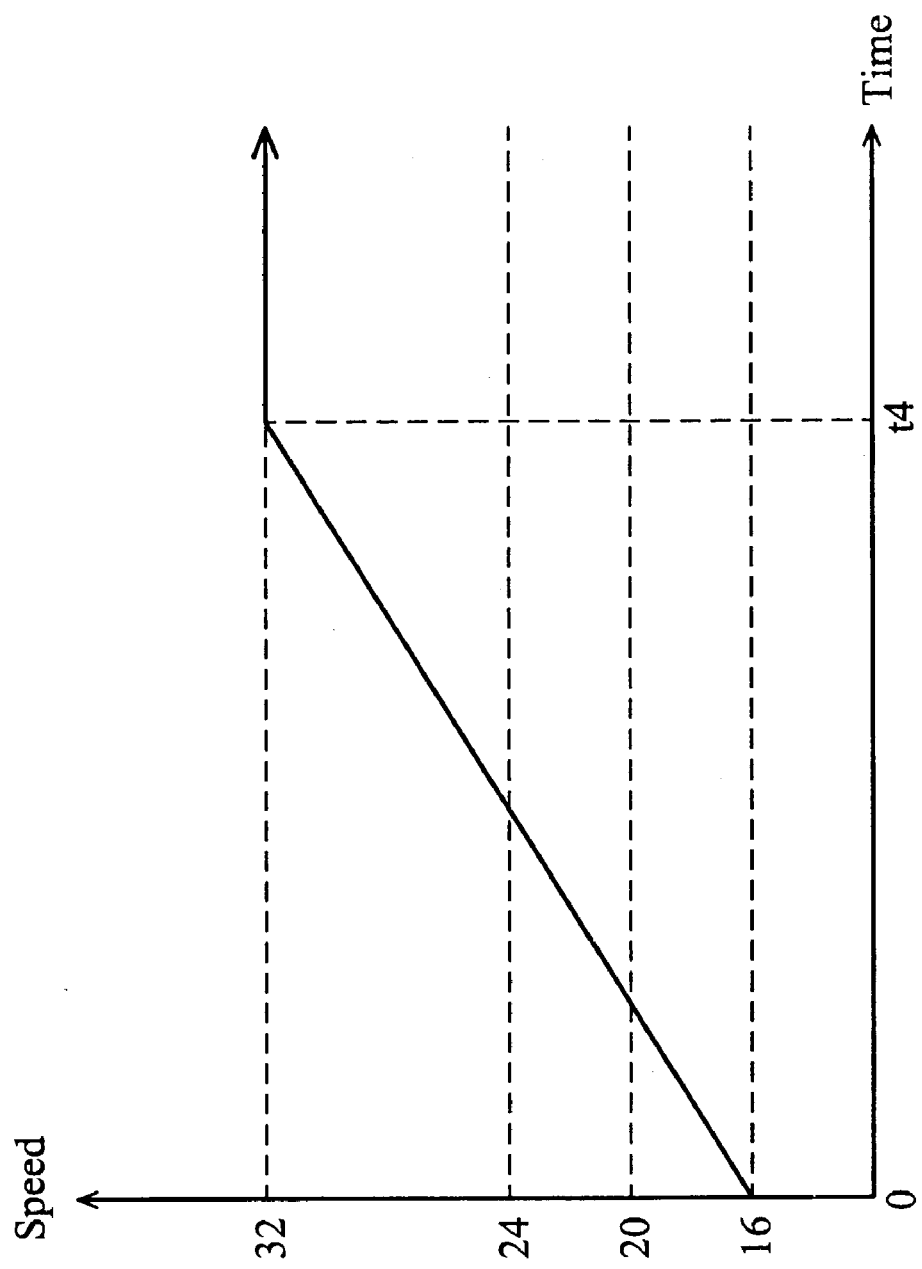
FIG. 3 shows the variation of write speed of another example of conventional data recording devices.
Figure 4:
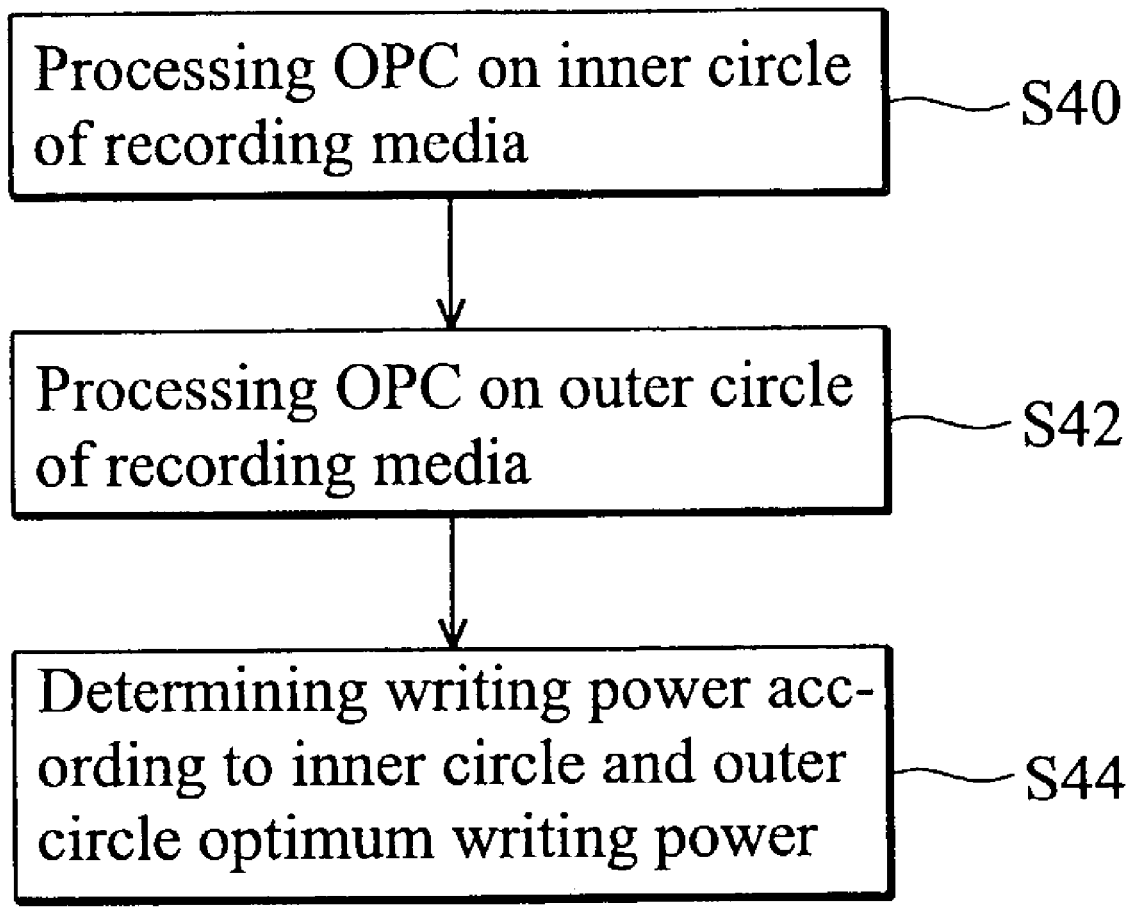
FIG. 4 is a flowchart illustrating the operation of a method for determining the writing power of data recording devices according to the first embodiment of the present invention.

FIG. 4 is a flowchart illustrating the operation of a method for determining the writing power of data recording devices according to the first embodiment of the present invention.

First, in step S40, the inner circle of recording media is processed with optimum power calibration (OPC) to obtain an inner circle optimum writing power. Then, in step S42, the outer circle of recording media is processed with optimum power calibration (OPC) to obtain an outer circle optimum writing power. The recording media may be CD-R or CD-RW.

Finally, in step S44, the writing power from inner to outer is determined according to the inner and outer circle optimum writing powers, respectively.

Figure 5:
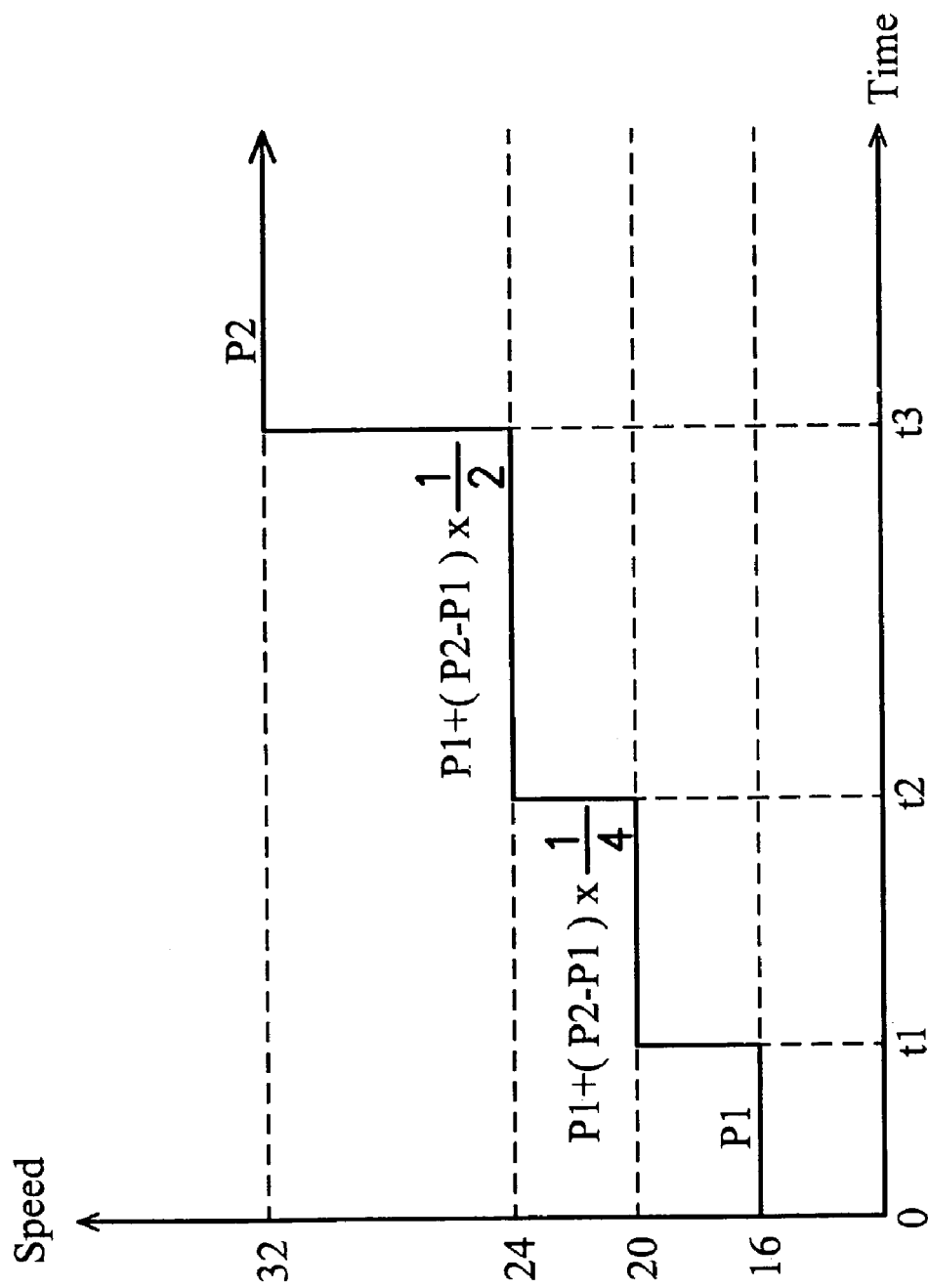
FIG. 5 is an example showing the variation of writing power of data recording devices according to the first embodiment of the present invention.

FIG. 5 is an example showing the variation of writing power of data recording devices according to the first embodiment of the present invention. In FIG. 5, the write speed is 16 in the time region 0~t1, the write speed is raised from 16 to 20 in the time region t1~t2, the write speed is raised from 20 to 24 in the time region t2~t3, and after time t3, the write speed is raised from 24 to the maximum write speed 32 and maintained until the recording finishes. In addition, the inner and outer circle optimum writing powers are P1 and P2, respectively.

The writing power for each time region in ZCLV mode can be determined according to the inner circle optimum writing power (P1) and the outer circle optimum writing power (P2), and calculated as follows:

$$RWP=ICOWP+\Delta P*[(RWS-IWS)/(MWS-IWS)],$$

where the RWP is the region writing power; ICOWP is the inner circle optimum writing power; $\Delta P$ is the difference of the outer circle optimum writing power and the inner circle optimum writing power; RWS is the write speed of the region (region write speed); IWS is the write speed of the inner circle (inner write speed); and MWS is the write speed of the outer circle (maximum write speed).

Therefore, in the case of FIG. 5, the writing power for time region 0~t1 (write speed 16) is P1; the writing power for the time region t1~t2 (write speed 20) is P1+(P2−P1)*((20−16)/(32−16)=P1+(P2−P1)*(¼); the writing power for the time region t2~t3(write speed 24) is P1+(P2−P1)*((24−16)/(32−16)=P1+(P2−P1)*(½); and the writing power after t3 (write speed 32) is P2.

Figure 6:
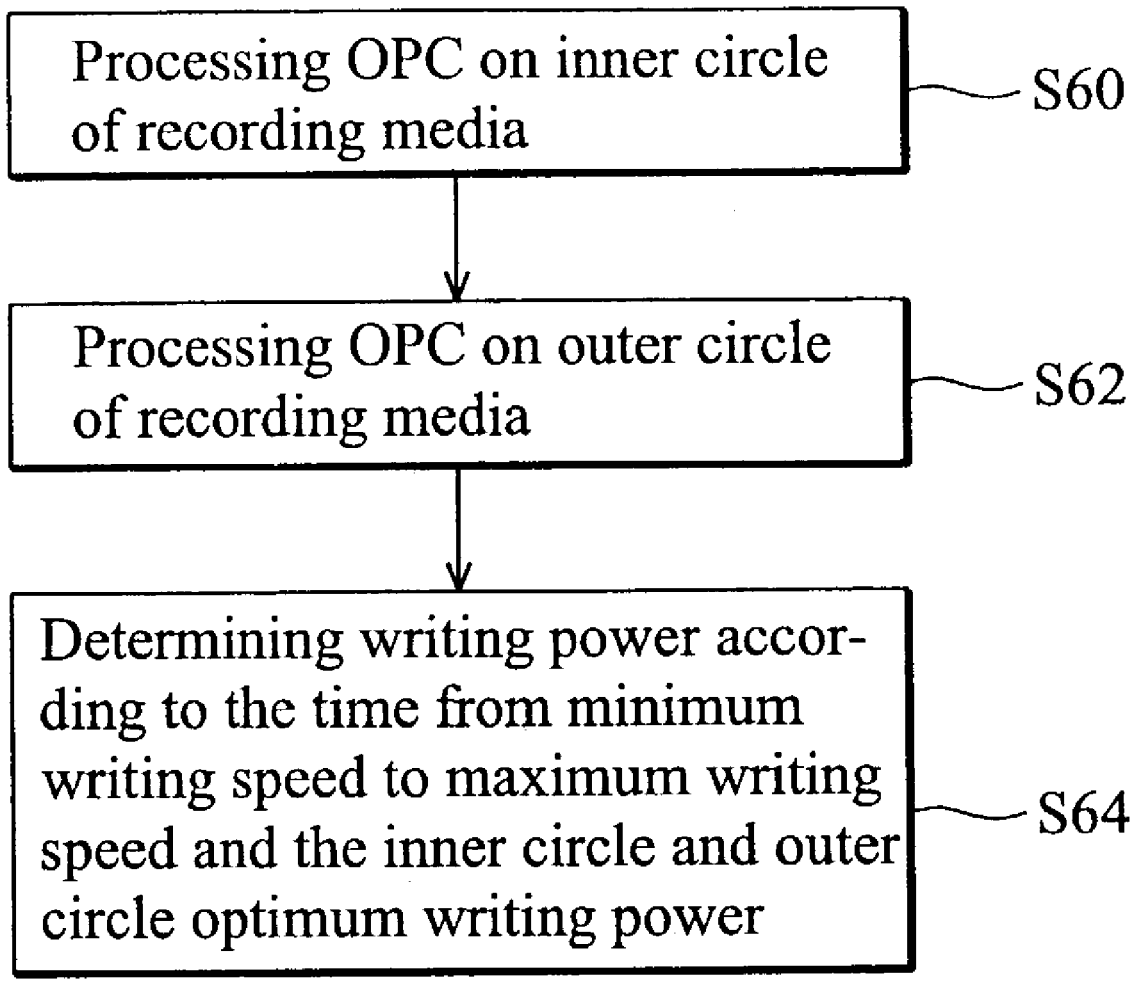
FIG. 6 is a flowchart illustrating the operation of a method for determining the writing power of data recording devices according to the second embodiment of the present invention.

FIG. 6 is a flowchart illustrating the operation of a method for determining the writing power of data recording devices according to the second embodiment of the present invention.

First, in step S60, the inner circle of recording media is processed with optimum power calibration (OPC) to obtain an inner circle optimum writing power. Then, in step S62, the outer circle of recording media is processed with optimum power calibration (OPC) to obtain an outer circle optimum writing power. The recording media may be CD-R or CD-RW.

Finally, in step S64, the writing power is determined according to the time when data recording device raises its write speed from the minimum to the maximum and the inner and outer circle optimum writing powers.

Figure 7:
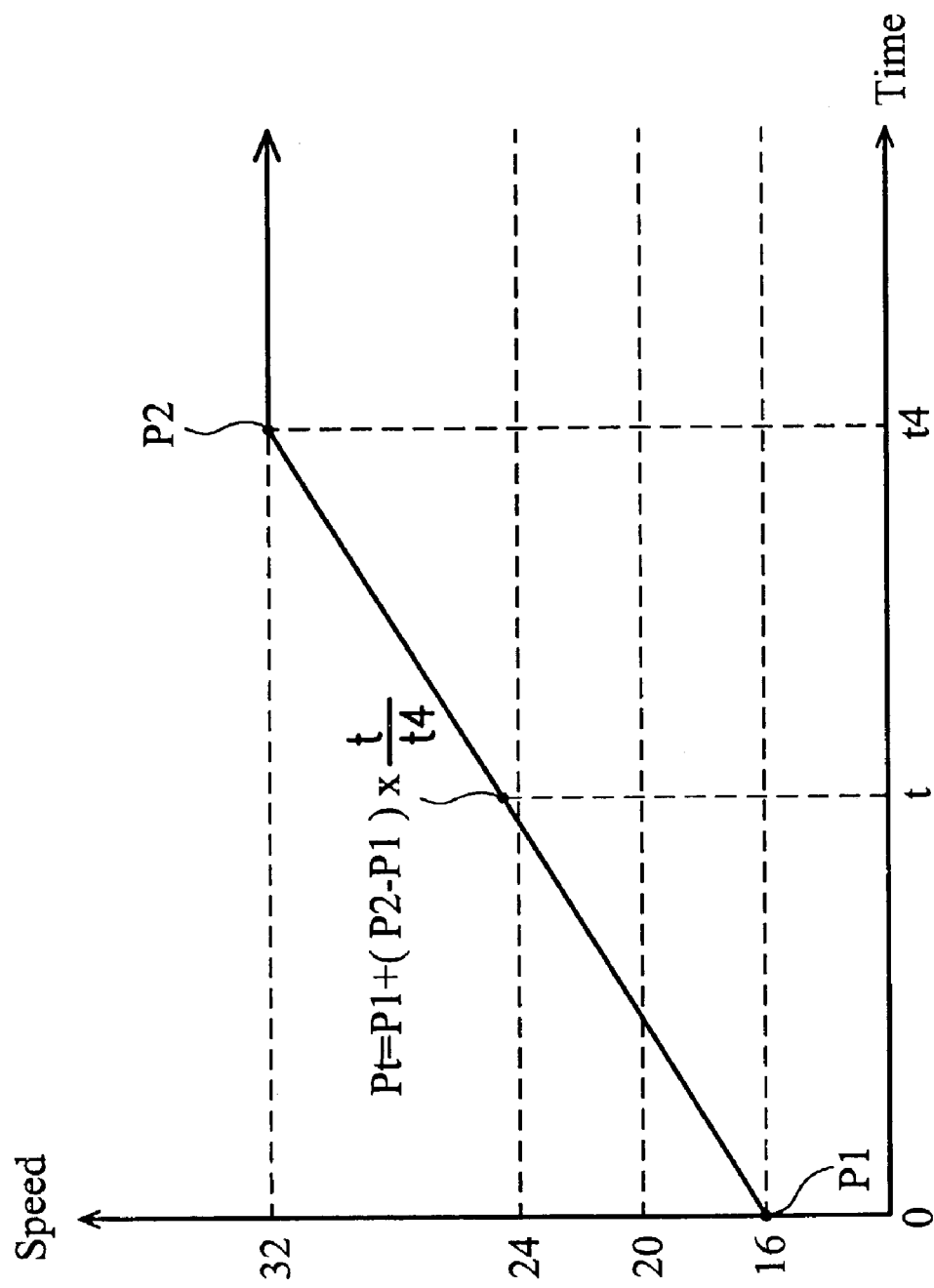
FIG. 7 is an example showing the variation of writing power of data recording devices according to the second embodiment of the present invention.

FIG. 7 is an example showing the variation of writing power of data recording devices according to the second embodiment of the present invention. In FIG. 7, the write speed is gradually raised from the minimum write speed 16 to the maximum write speed 32 in the time region 0~t4 and maintained until the recording finishes. In addition, the inner and outer circle optimum writing powers are P1 and P2, respectively riveting.

In time region 0~t4, the writing power at time t can be determined according to the time (t4) that the write speed is raised from the minimum write speed to the maximum write speed and the inner circle optimum writing power (P1) and the outer circle optimum writing power (P2), and calculated as follows:

$$Pt=ICOWP+\Delta P*[(t-0)/(t4-0)],$$

where the RWP is the region writing power; ICOWP is the inner circle optimum writing power; $\Delta P$ is the difference of the outer circle optimum writing power and the inner circle optimum writing power.

Thus, in the case of FIG. 7, the writing power at time t in the time region 0~t4 is P1+(P2−P1)*(t/t4), and the writing power after t4 is P2.

As a result, using the method for determining the writing power of data recording devices, the writing power can be dynamically determined according to the inner circle and outer circle optimum writing powers of recording media, so as to reduce writing failures.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for determining the writing power of a data recording device in a writing process, wherein the writing speed for the inner circle of recording media is the minimum write speed of the data recording device, the write speed for the outer circle of recording media is the maximum write speed of the data recording device, and the time of write speed is raised form the minimum write speed to the maximum write speed is $\Delta t$, comprising the steps of: processing optimum power calibration (OPC) on the inner circle of recording media to obtain an inner circle optimum writing power P1; processing optimum power calibration (OPC) on the outer circle of the recording media to obtain an outer circle optimum writing power P2; and determining the writing power according to P1, P2 and $\Delta t$, wherein the writing power at time t is P1+(P2−P1)*(t/$\Delta t$).

2. The method as claimed in claim 1 wherein the outer circle is the lead-out area of recording media.

3. The method as claimed in claim 1 wherein the data recording device is CD-R ROM.

4. The method as claimed in claim 1 wherein the data recording device is CD-RW ROM.

5. The method as claimed in claim 1 wherein the recording media is CD-R.

6. The method as claimed in claim 1 wherein the recording media is CD-RW.

* * * * *